United States Patent [19]
Majerus

[11] 3,865,403
[45] Feb. 11, 1975

[54] FOLDABLE BICYCLE AND KIT FOR MAKING SAME

[76] Inventor: Gary T. Majerus, Box 85, Sierra Madre, Calif. 91024

[22] Filed: June 14, 1973

[21] Appl. No.: 369,856

[52] U.S. Cl. .............................................. 280/287
[51] Int. Cl. ............................................... B62k 3/04
[58] Field of Search .................................... 280/287

[56] References Cited
UNITED STATES PATENTS

| | | | |
|---|---|---|---|
| 1,287,130 | 12/1918 | Starkenberg | 280/287 |
| 2,359,764 | 10/1944 | Johnson | 280/287 |
| 2,372,024 | 3/1945 | Schwinn | 280/287 |

FOREIGN PATENTS OR APPLICATIONS

| | | | |
|---|---|---|---|
| 273,589 | 5/1951 | France | 280/287 |

*Primary Examiner*—George E. A. Halvosa
*Assistant Examiner*—Stuart M. Goldstein
*Attorney, Agent, or Firm*—Christie, Parker & Hale

[57] ABSTRACT

The frame of a bicycle has top and bottom crossbars with two pairs of coaxial hinges which allow the bicycle to be folded into a compact form. In a preferred form of the invention, each crossbar has two longitudinally spaced apart hinged joints so the frame can be pivoted about one axis through a 90° arc and be separately pivoted about a second axis also through a 90° arc into a U-shaped form in which the overall length of the folded bicycle is about one-half the length of the bicycle in its standard configuration. Bolts engaged with each hinged joint can be tightened to hold the bicycle in its standard configuration when the bicycle is in use. The bolts also can be loosened so the frame can be swung into its folded configuration, the bolts then being tightened to hold the frame in its folded position. The present invention also includes a kit for converting a standard bicycle into the foldable bicycle of this invention. The kit includes a guide for marking where the crossbars are to be severed in preparation for installing the coaxial hinges, and hinged joint sections to be assembled by the user and installed in the crossbars of the bicycle frame.

13 Claims, 10 Drawing Figures

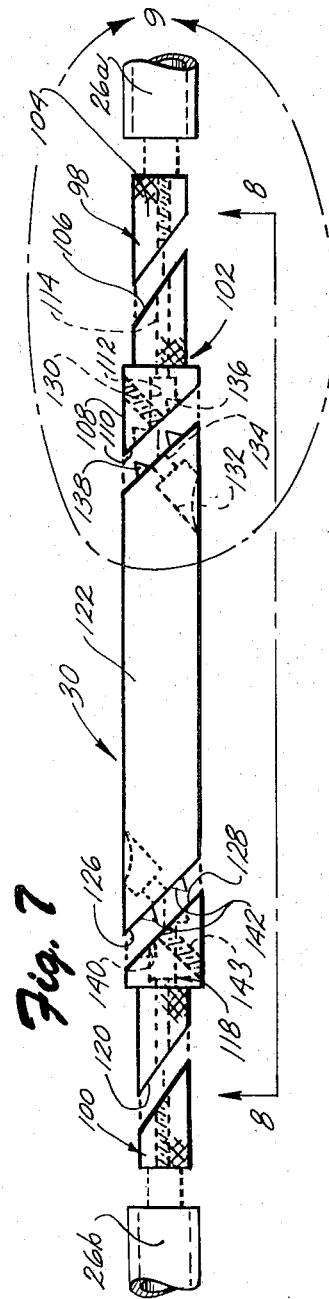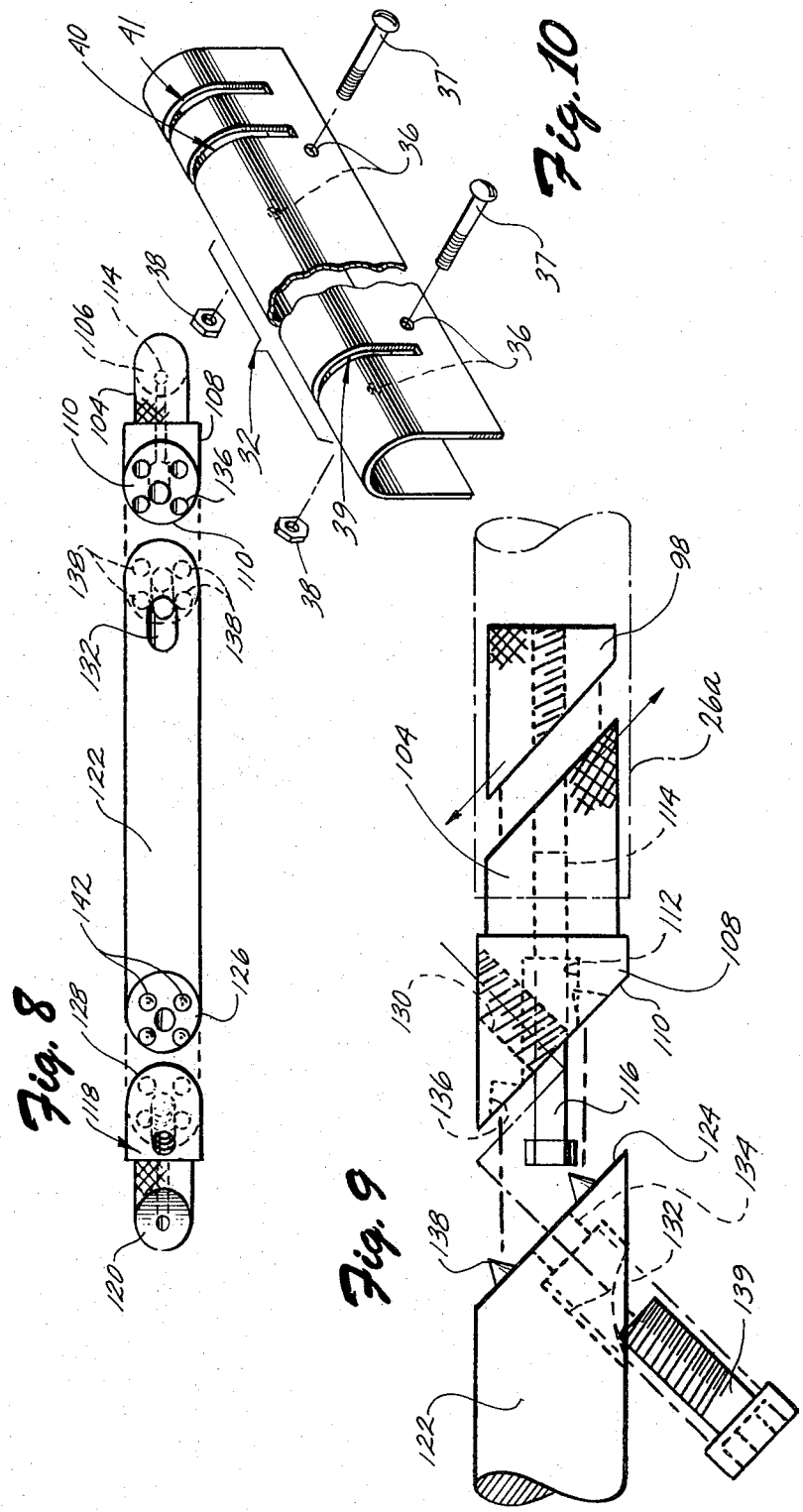

FOLDABLE BICYCLE AND KIT FOR MAKING SAME

BACKGROUND OF THE INVENTION

This invention relates to bicycles, and more particularly to a bicycle which can be folded into a compact form. In recent years, bicycle riding has become extremely popular in this country. Along with this popularity has come an increased number of bicycle trails, and the need for improved ways in which a bicycle rider can transport his bicycle to and from the bicycle trails or other points of use. The most common way of transporting bicycles today is to use a bicycle rack which is attached to the rear bumper of the user's automobile. However, there are several objections to bicycle racks, among which is the possibility that a bicycle carrier on the rear of an automobile is vulnerable to theft. Furthermore, the job of attaching and removing a bicycle rack can be time consuming and laborious, and in many instances standard bicycle racks do not fit all makes of automobiles.

In spite of these objections to bicycle racks, most bicycle riders use them because a bicycle of standard length is not easily fitted into the trunk or the interior of the rider's automobile. In some instances, a bicycle can fit into an automobile once the front wheel of the bicycle is removed. However, it can be a time consuming job to remove the front wheel, especially when the bicycle is equipped with calipertype handbrakes. Moreover, removal of one wheel often does not shorten the overall length of the bicycle sufficiently to allow it to fit into the automobile. Both wheels are not easily removed because of the difficulty in removing the rear wheel of a bicycle equipped with five-speed or 10-speed gear sprockets.

SUMMARY OF THE INVENTION

This invention provides a foldable bicycle which can be folded into such a compact form that the bicycle can be easily fitted into the trunks of most automobiles, thereby eliminating the need for bicycle racks or other carrying means which are attached to the rear of the automobile and carry the bicycle outside of the confines of the user's automobile.

Briefly, the foldable bicycle has top and bottom frame crossbars with coaxial hinges which allow the bicycle to be folded into a configuration having approximately one-half the length of the bicycle in its standard configuration. Preferably, each crossbar has two longitudinally spaced apart hinged joints arranged so that front and rear sections of the frame can be pivoted toward each other about two substantially parallel axes through the crossbars, which allows the bicycle to be folded to a compact, substantially U-shaped form. Releasable fastening means engaged with each hinged joint can be tightened to hold the bicycle frame in its standard configuration when the bicycle is in use. The fastening means also can be loosened so the frame can be pivoted into its folded configuration, and the fasteners can then be tightened to rigidly maintain the frame in its folded form.

This invention also provides a kit for use in converting a standard bicycle into the foldable bicycle of this invention. Preferably, the standard frame is converted by severing the top and bottom crossbars along an axis through the crossbars. The kit includes hinged joint sections to be assembled by the user and attached to the open ends of the front and rear crossbar sections which are formed where the frame is severed. The kit also includes a guide to be engaged with each crossbar to mark where the two crossbars are to be severed so as to assure that the bicycle will properly pivot into its desired compact form once the hinged joint sections are assembled and incorporated into the crossbars of the bicycle.

These and other aspects of the invention will be more fully understood by referring to the following detailed description and the accompanying drawings.

BRIEF DESCRIPTION OF THE DRAWINGS

FIG. 7 is an exploded fragmentary elevation view showing the hinged joint assembly within the circle 7 of FIG. 1;

FIG. 8 is an exploded plan view taken on line 8—8 of FIG. 7;

FIG. 9 is an exploded fragmentary elevation view showing the hinged joint assembly components within the circle 9 of FIG. 7; and FIG. 10 is an exploded perspective view showing guide means for use in severing the top and bottom crossbars of the bicycle.

DETAILED DESCRIPTION OF THE PREFERRED EMBODIMENT

Figure 1:
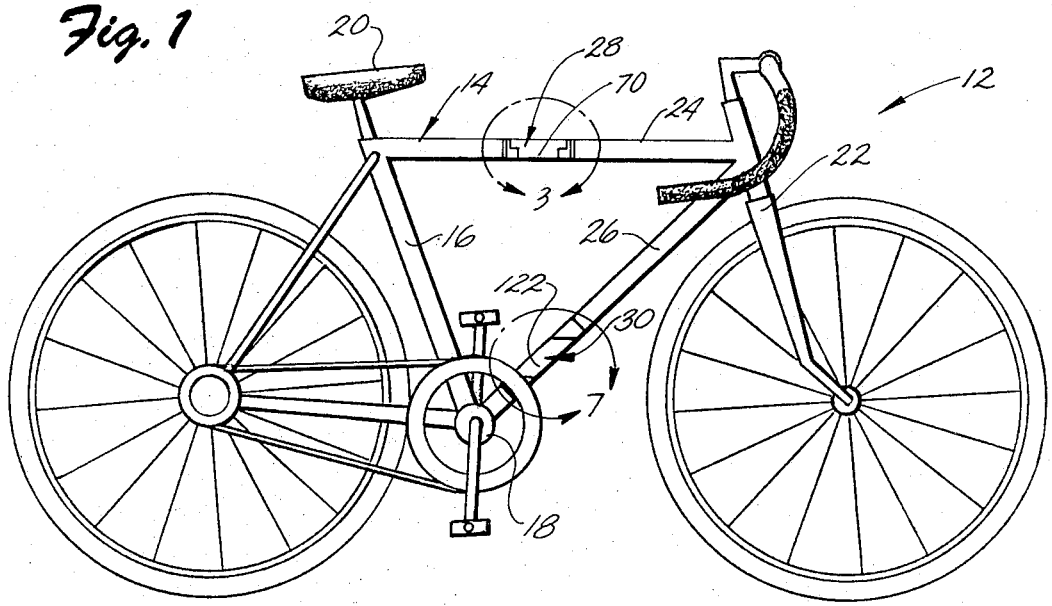
FIG. 1 is an elevation view showing the foldable bicycle of this invention in its standard unfolded form.

Referring to FIG. 1, a foldable bicycle 12 according to this invention has the well known "diamond frame" 14 which includes a substantially upright seat post 16 extending between a sprocket hub 18 and the point of connection of a seat 20 to the frame. The diamond frame also includes a fork 22 to which the front wheel of the bicycle is attached, and a horizontal top crossbar 24, and diagonal bottom crossbar 26 extending between the seat post and the fork. The present invention will be described in the context of its use in diamond frame 14, which in turn is used in what is commonly known as a "boy's bicycle." However, the present invention also can be used with what is commonly known as an "open frame" or "girl's bicycle" in which the top crossbar (not shown) is diagonal and disposed immediately above and substantially parallel to bottom crossbar 26.

Figure 2:
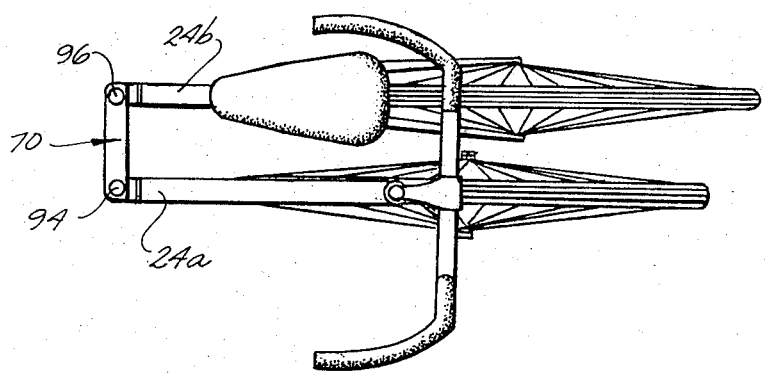
FIG. 2 is a plan view of the foldable bicycle of FIG. 1 in its folded position.

Top crossbar 24 includes an upper hinge assembly 28 in an intermediate portion of the top crossbar. Bottom crossbar 26 includes a lower hinge assembly 30 located adjacent to sprocket hub 18. The upper and lower hinge assemblies cooperate to provide a pair of longitudinally spaced apart hinge joints which are aligned so that the frame of the bicycle can be folded about two parallel axes extending substantially vertically through crossbars 24 and 26. As shown best in FIG. 2, the front portion of the bicycle can be folded through a 90° angle about an axis through the front pair of vertically aligned hinge joints, and the rear portion of the bicycle can be folded through a 90° angle about a second axis through the rear pair of vertically aligned hinge joints.

It is contemplated that the foldable bicycle of this invention can be produced directly by the bicycle manufacturer. However, those persons who already own a standard bicycle can convert the bicycle into the foldable bicycle of this invention by the use of a kit which includes the component parts of upper and lower hinge assemblies 28 and 30, together with a cut-off guide assembly 32 shown in FIG. 10.

When using the kit to install the hinge assemblies, the first step is to sever the top and bottom crossbars of the bicycle so the upper and lower hinge assemblies can be engaged with the open ends of the tubular crossbars at the points of severance. Preferably, each crossbar is severed in two places so a portion of each crossbar is removed. The length of each removed crossbar section is identical to the length of the hinge assembly which replaces the removed section so the foldable bicycle frame has substantially the same length as the original one-piece bicycle frame.

Each crossbar simply can be severed by the use of a hacksaw, using the guide assembly 32 provided by the kit of this invention for marking where the crossbars are to be severed. Guide assembly 32 includes a U-shaped elongated guide 34 made of forged aluminum. Guide 34 includes two pairs of longitudinally spaced apart holes 36, each pair being aligned on opposite sides of the guide to receive a corresponding threaded bolt 37 and nut 38 to be used in fastening guide 34 to either the top or bottom crossbar of the bicycle. A narrow slotted opening 39 is formed near one end of guide 34, and a pair of longitudinally spaced apart narrow slotted openings 40 and 41 are formed adjacent near the opposite end of guide 34.

In use, guide 34 is attached to the top crossbar so that the left edge of the guide (as viewed in FIG. 10) is spaced preferably eight inches from seat post 16. Slotted openings 39 and 40 mark the lines of severence of the top crossbar, and a hacksaw is used to cut through the crossbar, using slotted openings 39 and 40 as a guide. Bottom crossbar 26 is similarly severed, except that guide 34 is attached to the bottom crossbar so the left edge of the guide is spaced preferably 2 inches from sprocket hub 18. Slotted openings 39 and 41 are used as a guide in cutting through the bottom crossbar. A longer section is removed from the diagonal bottom crossbar than from the horizontal top crossbar so that the points of severance of the two crossbars will be located on two parallel axes extending vertically through the crossbars.

Figure 3:
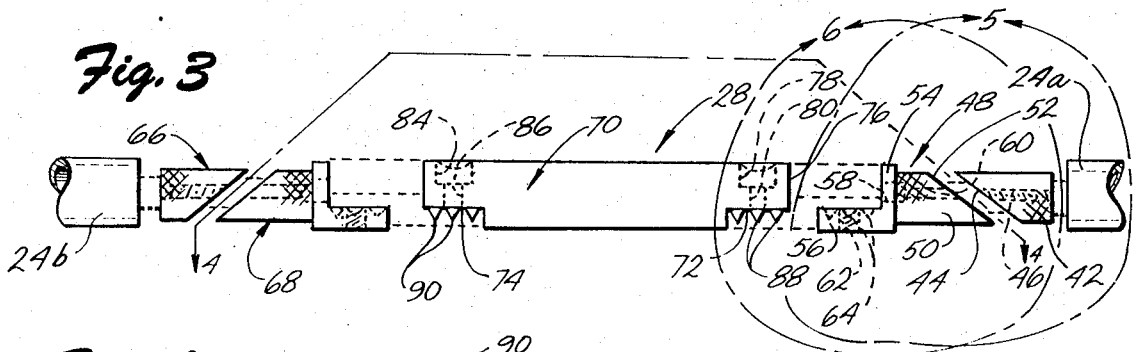
FIG. 3 is an exploded fragmentary elevation view showing the hinged joint assembly within the circle 3 of FIG. 1.
Figure 4:
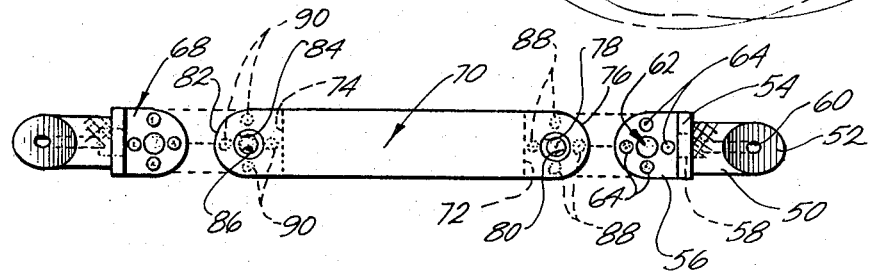
FIG. 4 is an exploded plan view taken on line 4—4 of FIG. 3.

Once the two crossbars have been severed, upper and lower hinge assemblies 28 and 30 are ready for installation. The detailed construction of upper hinge assembly 28 is understood best by referring to FIGS. 3–6. FIG. 3 shows the upper hinge assembly in an exploded view in longitudinal alignment with front and rear sections 24a and 24b, respectively, of the severed top crossbar. The upper hinge assembly includes a front insert piece 42 having a knurled outer surface, an angular edge surface 44 at one end, and a threaded bore 46 extending axially through the insert piece. The upper hinge assembly also includes a front hinge section 48 having a cylindrical body 50 with a knurled outer surface, and an angular edge surface 52 at one end lying an angle which is the complement of the angle defined by edge 44 of front insert piece 42. Thus, when insert piece 42 and hinge section 48 are aligned longitudinally with the top crossbar sections, angular edge surfaces 44 and 52, respectively, engage each other along a common plane which is inclined relative to the longitudinal axis of the top crossbar. Preferably, the outside diameter of both insert piece 42 and body 50 is slightly less than the inside diameter of front crossbar section 24a.

Front hinge section 48 also includes an L-shaped hinge piece having an upright leg portion 54 which is integral with the end of body 50 opposite angled end surface 52, and a horizontally extending leg portion 56 integral with the bottom of leg 54 and extending away from body 50. Leg portions 54 and 56 preferably are circular when viewed on end so that the curvature of their outer surface matches the outside diameter of crossbar section 24a. A stepped bore extends axially through front hinge section 48 in longitudinal alignment with bore 46 of insert piece 42. The stepped bore includes a smooth large bore 58 which extends through leg 54 and into a portion of body 50, and a second smooth bore 60 of smaller diameter extending from bore 58 through the remaining portion of the front hinge section. A threaded bore 62 extends vertically through leg portion 56. Four radially spaced spart conical indentations 64 are formed in the horizontal top surface of leg portion 56. The indentations are spaced 90° apart from each other about a vertical axis extending through the center of bore 62.

Upper hinge assembly 28 also includes a rear insert piece 66 identical in construction to front insert piece 42 and thus the description for insert piece 42 will suffice for insert piece 66. Similarly, upper hinge assembly 28 also includes a rear hinge section 68 identical in construction to front hinge section 48, so the description for hinge section 48 will correspond to that of hinge section 68.

Upper hinge assembly 28 further includes a cylindrically curved solid crossbar piece 70 having a right angle notch 72 formed in the bottom of the piece at one end thereof, and a second right angle notch 74 formed in the bottom of the piece at its opposite end. The outside diameter of crossbar piece 70 matches the outside diameter of crossbar sections 24a and 24 and the L-shaped hinge pieces of hinge sections 48 and 68. Notch 72 is shaped so that the front portion of crossbar piece 70 can rest on top of leg 56 and against leg 54. Similarly, notch 74 allows the rear portion of crossbar piece 70 to rest on the horizontal leg of rear hinge section 68. A rounded edge surface 76 is formed at the front end of crossbar piece 70. The front end portion of crossbar piece 70 also includes a vertically disposed stepped bore having an enlarged smooth bore 78 opening outwardly at the top of crossbar piece 70 and extending about half-way through the crossbar piece front section, and a narrow smooth bore 80 extending from bore 78 through the remaining portion of the crossbar piece front section. The rear section of crossbar piece 70 is identical to the front end and includes a rounded end surface 82, and a step bore having an enlarged smooth bore 84 and a narrow smooth bore 86. The downwardly facing and horizontally disposed bottom edge of notch 72 includes four radially spaced apart conical-shaped shoulders 88 spaced 90° apart about an axis through bore 80. Shoulders 88 are positioned so they can engage conical recesses 64 to hold the front section of crossbar piece 70 in longitudinal alignment with body 50 and insert piece 42. The rear notch 74 of crossbar piece 70 also includes four equidistantly spaced apart downwardly extending shoulders 90 adapted for engagement with cooperating conical recesses formed in the horizontal leg of rear hinge section 68.

Figure 5:
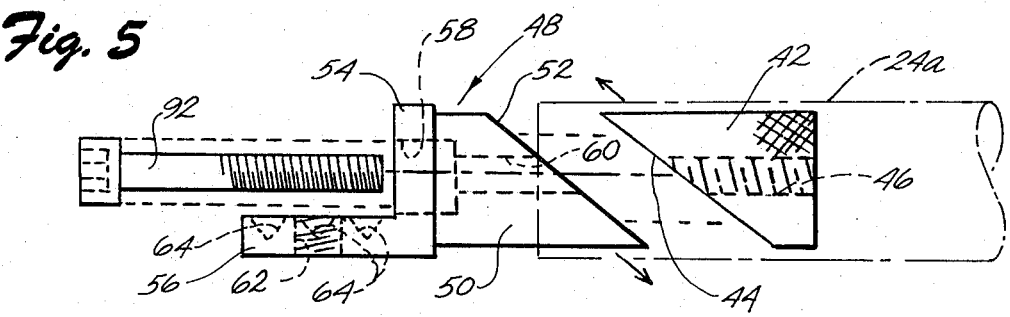
FIG. 5 is an exploded fragmentary elevation view showing the hinged joint assembly components within the circle 5 of FIG. 3.
Figure 6:
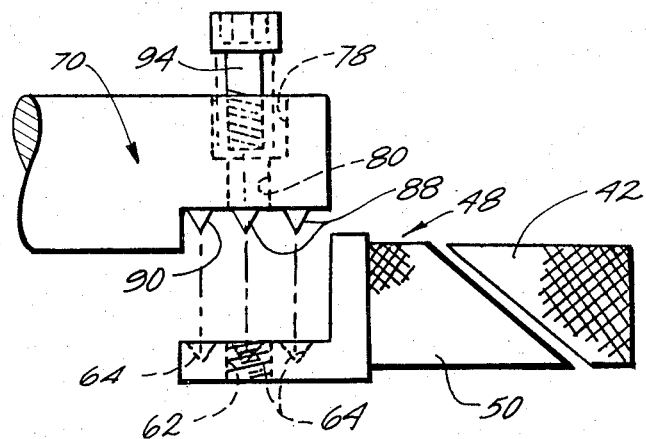
FIG. 6 is an exploded fragmentary elevation view showing the hinged joint assembly components within the circle 6 of FIG. 3.

The installation of upper hinge assembly 28 is understood best by referring to FIGS. 5 and 6. Insert pieces 42 and 66 are initially mounted in their respective front and rear crossbar sections 24a and 24b. FIG. 5 shows insert piece 42 inserted in the interior of the tubular crossbar section 24a. Each hinge section 48 and 68 is then engaged with its corresponding insert piece to rigidly fix the two hinge sections against the open ends of the severed top crossbar so that the upper edge surface of the horizontal leg of each hinge member lies in a horizontal plane. FIG. 5 shows this method of installation for front hinge section 48. An elongated bolt 92 is extended through bore 60 and threaded into bore 46. The bolt is tightened by an Allenhead wrench to pull the two inclined surfaces 44 and 52 into a wedging engagement inside tubular front crossbar section 24a. Complete tightening of bolt 92 will cause the inclined surfaces of the two members to move apart slightly in the directions of the arrows shown in FIG. 5 to become wedged and thereby lock the two members in the front crossbar section. Similarly, the rear insert piece 66 and rear hinge section 68 are rigidly secured in the open end of rear crossbar section 24b by tightening a second Allenhead bolt (not shown) in a manner identical to that described for front insert piece 42 and hinge section 48.

Once the front and rear hinge sections 48 and 68 are firmly in place, crossbar piece 70 is installed by engaging shoulders 88 and 90 with their corresponding recessed portions of the front and rear hinge sections, respectively, to hold crossbar piece 70 in longitudinal alignment with the front and rear hinge sections and crossbar sections. The front section of the crossbar piece 70 is rigidly secured to front hinge section 48 by an Allenhead bolt 94 which is countersunk in bore 78 and threaded into engagement with bore 62. Likewise, a second Allenhead bolt 96 (shown in FIG. 2) is countersunk in bore 84 and threaded into engagement with the bore in the longitudinal leg of rear hinge section 68. Bolts 94 and 96 are both tightened to securely fasten crossbar piece 70 in longitudinal alignment with the front and rear crossbar sections 24a and 24b, respectively, to provide the equivalent of a single rigid top crossbar.

The detailed construction of lower hinge assembly 30 is understood best by referring to FIGS. 7 through 9. The hinge assembly includes a pair of cylindrical front and rear insert pieces 98 and 100, respectively, which are identical to insert pieces 42 and 66 and thus adapted to fit into front and rear sections 26a and 26b, respectively, of the severed bottom crossbar.

Bottom hinge assembly 30 also includes a front hinge section 102 having a cylindrical body 104 with a knurled outer surface, and angular edge surface 106 at one end adapted to engage the angular edge of front insert piece 98. Front hinge section 102 also includes a cylindrical body 108 of larger diameter than body 104 so that body 108 matches the outer curvature of front crossbar section 26a. Body 108 includes an angled end surface 110 on the end of the hinge section opposite end surface 106. A stepped bore extending axially through bodies 104 and 108 includes an enlarged smooth bore 112 extending from angular end surface 110 through a major portion of body 108, and a narrower smooth bore 114 extending through the remaining portion of hinge section 102. Front hinge section 102 is locked into engagement with the open end of front crossbar section 26a in a manner identical to that described above for hinge section 48. Insert piece 98 is disposed in the interior of crossbar section 26a as shown in FIGS. 7 and 9, and edge surface 106 hinge section 102 is engaged with insert piece 98 so that angular edge 110 of hinge section 102 lies in a substantially horizontal plane as shown in FIG. 1. Hinge section 102 is rigidly fixed to insert piece 98 by an elongated Allenhead bolt 116 which is countersunk in bore 112 and threaded into the bolt in insert piece 98. Bolt 116 is tightened to move the inclined edges of hinge section 102 and insert piece 98 apart, as represented by the arrows in FIG. 9, to wedge the hinge section in the end of crossbar section 26a.

Lower hinge assembly 30 also includes a rear hinge section 118 which is identical in construction to hinge section 102 and is to be disposed in the open end of crossbar section 26b. Rear hinge section 118 receives a second countersunk Allenhead bolt (not shown) to be threaded into the bore through insert piece 100 to lock rear hinge section 118 in rear crossbar section 26b so the angular end surface 120 of rear hinge section 118 lies in a substantially horizontal plane, as shown in FIG. 1.

Lower hinge assembly 30 further includes an elongated cylindrical bottom crossbar piece 122 having an angular front end surface 124 lying on an angle which is complementary to the angle of end 110 of rear hinge section 118.

In assembling the lower hinge assembly, angular end 110 of the front hinge section is disposed against end 124 of crossbar piece 122. End 110 is rounded, as shown best in FIG. 8, and includes an angularly disposed threaded bore 130 opening centrally through end surface 110 and extending on an angle through body 108 along an axis perpendicular to the plane defined by end surface 110. The front end surface of crossbar piece 122 includes a stepped bore having an enlarged smooth bore 132 opening through the bottom of the crossbar piece and extending on an angle which is in a longitudinal alignment with bore 130 of front hinge section 102. The stepped bore in crossbar piece 122 narrows down to a smooth bore 134 which then opens through the center of angular end surface 124. The stepped bore aligns longitudinally with threaded bore 130, when the front end of crossbar piece 122 is engaged with front hinge section 102.

Angular end surface 110 of body 108 includes four radially spaced apart, conical-shaped recesses 136 spaced 90° apart about an axis through bore 130. The angular end surface 124 of crossbar piece 122 includes cooperating conical shaped shoulders 138 spaced 90° apart and positioned so as to engage recesses 136 to hold the front end of crossbar section 122 in longitudinal alignment with body 108 thereby forming the equivalent of a continuous crossbar. An elongated Allenhead bolt 139 is countersunk in bore 132 and threaded into bore 130 to securely fasten the front end portion of crossbar piece 122 to front hinge section 102.

Rear hinge section 118 is identical to front hinge section 102 and includes conical recesses 140 of identical configuration and arrangement to recesses 136. Similarly, the rear end section of crossbar piece 122 includes cooperating conical-shaped shoulders 142 adapted to engage recesses 140. The rear end section of crossbar piece 122 also includes a stepped bore identical in configuration to the stepped bore at the other end of the crossbar piece for receiving a second Allenhead bolt (not shown) to be threaded into an angular bore 143 extending through rear hinge section 118 to rigidly fix the rear portion of crossbar piece 122 to rear hinge section 118.

As shown best in FIG. 1, bottom crossbar piece 122 is slightly longer than upper crossbar piece 70 so that the front ends of the two crossbar pieces form hinged joints lying on a first vertical axis through the two crossbars, and so that the two rear ends of the two crossbar pieces form hinged joints lying along a second vertical axis spaced to the rear of the first axis. Thus, the hinged joints provide two axes about which the front and rear sections of the severed bicycle frame can pivot, thereby allowing the frame of the bicycle to be swung into the folded position shown in FIG. 2. The length of the top and bottom crossbar pieces, and their positions in the top and bottom crossbars allow the bicycle to be folded so that the front and rear wheels of the bicycle are substantially in alignment, providing a compact folded configuration.

When the bicycle is to be folded, bolts 94 and 96 are loosened several turns as are bolts 139 and its corresponding rear bolt (not shown). The front portion of the bicycle is then swung through a 90° arc whereupon shoulders 88 and 138 will engage corresponding conical recesses 64 and 136 respectively. The two bolts are then tightened to hold the front section of the frame at a 90° angle relative to crossbar pieces 70 and 122. The rear portion of the bicycle frame is then folded toward the folded front portion of the frame by loosening the bolts which hold the top and bottom crossbar pieces to their respective rear hinge section, and then rotating the rear portion of the bicycle frame through a 90° angle until shoulders 90 and 142 engage their corresponding conical recesses. The rear bolts are then tightened to hold the rear section of the bicycle frame in a fixed position relative to top and bottom crossbar pieces 70 and 122.

When the user wants to put the bicycle into use, the above procedures are reversed and the bolts tightened to hold the bicycle in a rigid planar position as shown in FIG. 1.

Preferably, all component parts of the upper and lower hinge assemblies, together with guide assembly 32, are provided in a single kit, which can also include Allen wrenches for the Allenhead bolts. The component parts of the top and bottom hinge assemblies preferably are made of forged aluminum which provides strength for the bicycle frame equivalent to that of the frame in its standard configuration.

I claim:

1. For use in a bicycle having a frame which includes a fork to which the bicycle front wheel is attached, a seat post extending from the sprocket hub to the point of attachment of the seat, and top and bottom crossbars extending between the seat post and the fork, the top and bottom crossbars being tubular in construction, a kit for altering the frame of the bicycle so the frame can be folded once the two crossbars are severed along an axis through the two crossbars, the kit including first and second upper insert pieces to be fitted into the two open ends of the top crossbar provided at the point of severance thereof, first and second lower insert pieces to be fitted into the two open ends of the bottom crossbar provided at the point of severance thereof, a first upper hinge member to be engaged with the first upper insert piece, a second upper hinge member to be engaged with the second upper insert piece, a first lower hinge member to be engaged with the first lower insert piece, a second lower hinge member to be engaged with the second lower insert piece, means for fastening the first upper hinge member to the first upper insert piece, means for fastening the second upper hinge member to the second upper insert piece, means for fastening the first lower hinge member to the first lower insert piece, means for fastening the second lower hinge member to the second lower insert piece, a rigid elongated upper crossbar piece to be extended between the first and second upper hinge members, a rigid elongated lower crossbar piece to be extended between the first and second lower hinge members, first upper fastening means for releasably securing the upper crossbar piece to the first upper hinge member, second upper fastening means for releasably securing the upper crossbar piece to the second upper hinge member, first lower fastening means for releasably securing the lower crossbar piece to the first lower hinge member, second lower fastening means for releasably securing the lower crossbar piece to the second lower hinge member, the point of connection between each crossbar piece and its cooperating hinge member providing a hinged joint which allows the bicycle frame to be releasably held in a planar position providing a standard bicycle frame, or in a folded position in which the length of the bicycle is shortened relative to its standard length.

2. Apparatus according to claim 1 including guide means to be engaged with each crossbar to mark the coaxial point of severance of the two crossbars.

3. Apparatus according to claim 2 in which the guide means includes an elongated guide frame to be engaged with each crossbar to mark the point of severance thereof, and fastening means to be engaged with the guide frame for releasably securing the guide frame to the crossbars.

4. Apparatus according to claim 1 including cooperating detent means and receptacle means formed in the interface between each crossbar piece and its corresponding hinge members for forming said hinged joints.

5. Apparatus according to claim 4 in which the detent means are arranged so the upper crossbar section may be engaged with its cooperating hinge members to hold the hinge members at 90° angles relative to the axis of the upper crossbar section, and so the lower crossbar section may be engaged with its corresponding hinge members to hold the lower hinge members at 90° angles relative to the axis of the lower crossbar section.

6. Apparatus according to claim 1 in which the interface between each insert section and its corresponding hinge member is on an angle which is inclined relative to the axis of its respective crossbar, in which the hinge member has a smooth bore aligned with a threaded bore of its corresponding insert section, and in which the means for releasably fastening each hinge member to its corresponding insert section comprises a separate threaded fastener adapted to fit through the smooth bore and be engaged with the threaded bore so that tightening of the fastener wedges the hinge member and insert piece combination into engagement with the interior of the crossbar.

7. In a bicycle having a frame which includes a fork to which the bicycle front wheels are attached, a seat post extending from the sprocket hub to a point of attachment for the bicycle seat, and top and bottom crossbars extending between the seat post and the fork and normally being in a common plane, the top and bottom crossbars being severed to define respective front and rear sections thereof, means for folding the bicycle into a compact form comprising:

first and second upper hinge members attached to the front and rear sections of the top crossbar, respectively, first and second lower hinge members attached to the front and rear sections of the lower crossbar, respectively, a rigid, elongated upper crossbar piece extending between the first and second upper hinge members, a rigid, elongated lower crossbar piece extending between the first and second lower hinge members, first upper fastening means providing a hinged joint located in the normal plane of the top crossbar for connecting one end of the first crossbar piece to the first upper hinge member, second upper fastening means providing a hinged joint located in the normal plane of the top crossbar for connecting the other end of the upper crossbar piece to the second upper hinge member, first lower fastening means providing a hinged joint located in the normal plane of the bottom crossbar for connecting one end of the lower crossbar piece to the first lower hinge member, and second lower fastening means providing a hinged joint located in the normal plane of the bottom crossbar for connecting the other end of the lower crossbar piece to the second lower hinge member, the first upper and lower fastening means being adjustable between (1) tightened positions in which they normally hold the first upper and lower hinge members in the same plane as the upper and lower crossbar pieces, respectively, and (2) loosened positions in which they allow the first upper and lower hinge members to pivot relative to the upper and lower crossbar pieces, respectively, about a first axis through the hinged joints provided by said first upper and lower fastening means, the second upper and lower fastening means being adjustable between (1) tightened positions in which they normally hold the second upper and lower hinge members in the same plane as the upper and lower crossbar pieces, respectively, and (2) loosened positions in which they allow the second upper and lower hinge members to pivot relative to the upper and lower crossbar pieces, respectively, about a second axis through the hinged joints provided by said second upper and lower fastening means.

8. Apparatus according to claim 7 in which each fastening means includes cooperating detent and receptacle means formed at the interface between the end of each crossbar piece and its corresponding hinge member, the cooperating detent and receptacle means being engageable when the upper and lower crossbar pieces are aligned in a common plane with their respective hinge members.

9. Apparatus according to claim 8 in which the detent and receptacle means corresponding to the first upper and lower hinge members also are releasably engageable when the first upper and lower hinge members are folded to an angle of about 90° relative to the plane of the upper and lower crossbar pieces, and in which the detent and receptacle means corresponding to the second upper and lower hinge members also are releasably engageable when the second upper and lower hinge members are folded to an angle of about 90° relative to the plane of the upper and lower crossbar pieces, and in which each fastening means also includes a separate fastener to be tightened for rigidly holding the respective upper and lower hinge members in their folded positions at 90° angles relative to the plane of the upper and lower crossbar pieces.

10. Apparatus according to claim 7 in which each fastening means includes at least four radially spaced apart, releasably engageable detent and receptacle means formed at the interface between the end of each crossbar piece and its corresponding hinge member, and a separate fastener at each interface extending centrally through its corresponding detent and receptacle means for being tightened to hold the detent and receptacle means rigidly in engagement or to be loosened to allow the detent and receptacle means to be released from engagement and folded with respect to each other through an angle of about 90° for further rigid engagement by tightening of the fasteners.

11. Apparatus according to claim 10 in which the hinge members and the crossbar pieces are generally rounded to match the outer contour of the front and rear crossbar sections.

12. Apparatus according to claim 11 in which the fasteners are countersunk to avoid protruding parts.

13. Apparatus according to claim 7 in which the front and rear sections of the top and bottom crossbars are tubular, and further including first and second upper insert pieces fitted into the two open ends of the front and rear sections of the top crossbar, respectively, first and second lower insert pieces fitted into the two open ends of the front and rear sections of the bottom crossbars, respectively, means for fastening the first and second upper hinge members to the first and second upper insert pieces, respectively, and means for fastening the first and second lower hinge members to the first and second lower insert pieces, respectively, such that the upper hinge members extend from the ends of the front and rear sections of the top crossbar and the lower hinge members extend from the ends of the front and rear sections of the lower crossbar for attachment to their respective crossbar pieces.

* * * * *